June 12, 1951 H. W. HAPMAN 2,556,182
PUSHER CONVEYER STRUCTURE
Filed Aug. 18, 1945 5 Sheets-Sheet 1

INVENTOR
Henry W. Hapman
BY
Barthel + Bugbee
ATTORNEYS

June 12, 1951 H. W. HAPMAN 2,556,182
PUSHER CONVEYER STRUCTURE
Filed Aug. 18, 1945 5 Sheets-Sheet 2

INVENTOR
Henry W. Hapman
BY Barthel + Bugbee
ATTORNEYS

June 12, 1951

H. W. HAPMAN 2,556,182

PUSHER CONVEYER STRUCTURE

Filed Aug. 18, 1945

H. W. HAPMAN 2,556,182

PUSHER CONVEYER STRUCTURE

Filed Aug. 18, 1945

INVENTOR.
Henry W. Hapman
BY Barthel + Bugbee
Att'ys

Patented June 12, 1951

2,556,182

UNITED STATES PATENT OFFICE 2,556,182

PUSHER CONVEYER STRUCTURE

Henry W. Hapman, Detroit, Mich., assignor, by mesne assignments, of forty per cent to Hannah Jane Hapman, Detroit, Mich.

Application August 18, 1945, Serial No. 611,380

7 Claims. (Cl. 198—168)

The present invention relates to improvements in conveyors and has reference more particularly to the movement of the endless conveyor element out of the flow path while the same is traversing turns, bends or wherever a direction of the endless conveyor element is changed.

The primary object of the invention is to provide a conveyor structure with conveyor displacing and guiding devices at the turns or bends thereof for causing the conveyor element to move out of the flow path while negotiating the bend or turn so as to prevent the material being handled from clogging or becoming packed about the gear, pulley or sprocket wheels employed for guiding and driving the endless conveyor element.

Another object of the invention is to provide a conveyor structure having conveyor displacing and guiding devices at the various bends or turns thereof for causing the conveyor element to travel in a sinuous pathway about a pulley, sprocket or gear wheel which is mounted outside of the bend or turn in such a manner as to cause the material to be freed from the endless conveyor element while the same is traversing said gear, sprocket or pulley wheel.

Another object of the invention is to provide a conveyor structure having conveyor displacing and guiding devices in which the various pulley, gear and sprocket wheels for guiding the endless conveyor element are arranged out of the flow path of the material being handled so that the material will not cause excessive wear of the bearings of the sprocket, pulley or gear wheel over which the endless conveyor element is trained.

Another object of the invention is to provide a conveyor structure having conveyor displacing and guiding devices in which the various pulley, gear and sprocket wheels are arranged so as to negotiate the turn or bend without necessitating the use of dribble chutes, spill returns or other means for preventing the various sprocket, pulley and gear wheels from becoming clogged and obstructed by the material being handled.

Another object of the invention is to provide a conveyor displacing and guiding device for the turns and bends of conveyor structures between the various vertical and horizontal courses or runs thereof which is arranged so that the material being handled will be freed from the endless conveyor element during the traversing of said endless conveyor element about said bend or turn and will again be picked up by the conveyor element for being conveyed along another course.

Another object of the invention is to provide a conveyor displacing and guiding device of the above-mentioned type in which the conveyor pulley, sprocket or gear wheels over which the endless conveyor element is trained may be adjusted to provide a take-up to eliminate slack in the endless conveyor element and compensate for wear of the endless conveyor links and pins.

Other objects and advantages of the invention will become apparent during the course of the following description of the accompanying drawings, wherein.

*Detailed description of the invention shown in Figures 1 to 6 inclusive*

As shown in Figures 1 to 6 inclusive, the invention is applied to a run-around conveyor including parallel upper and lower conveyor conduits 5 and 6 connected by vertically extending conduits 7 and 8. The vertical conveyor conduits 7 and 8 are connected to the lower horizontal conduit 6 by means of elbows 9 and 10, and the upper horizontal conduit 5 is adapted to be connected to the vertical conduits 7 and 8 by conveyor displacing and guiding devices, generally designated 11 and 12. Interposed in the lower conveyor conduit 6 is a series of fittings 13, 14 and 15 having vertical feed pipes 16, 17 and 18 for connecting hoppers or bins 19, 20 and 21 with the lower course or horizontal run 6.

Figure 1:
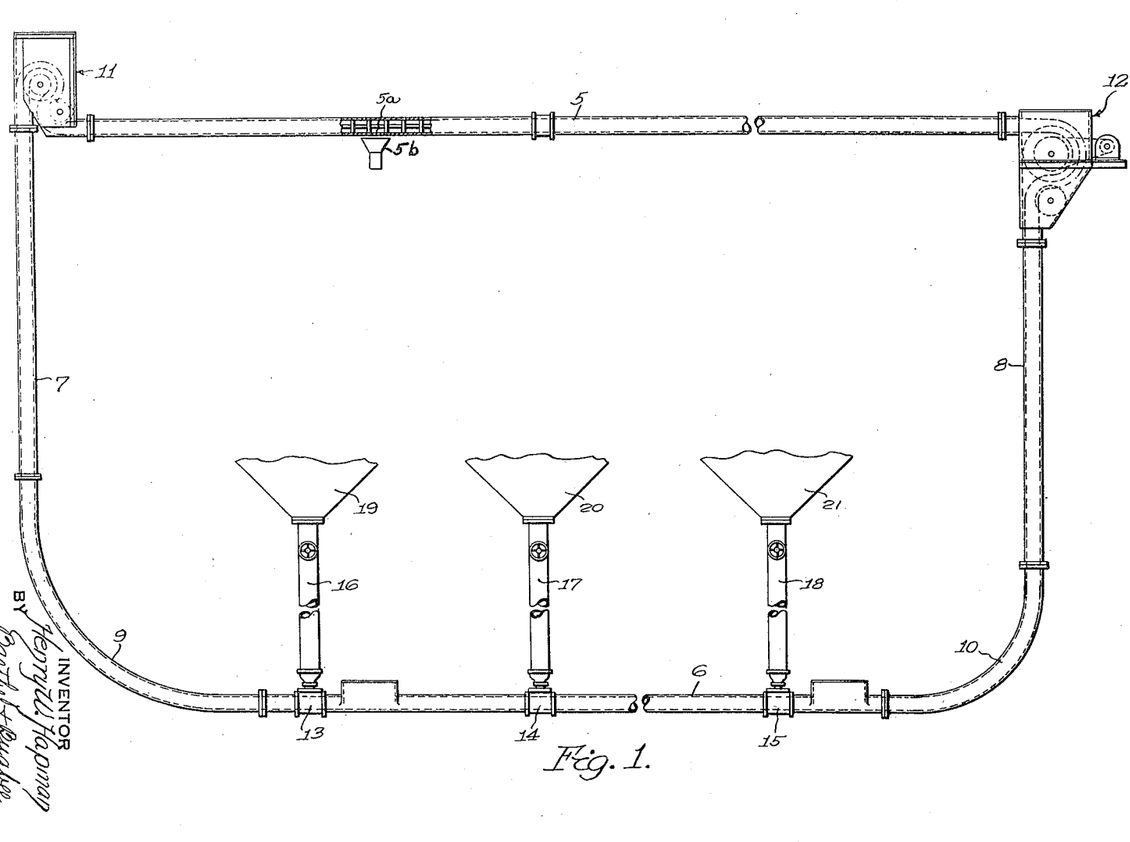
Figure 1 is a side elevational view of a run-around conveyor structure illustrating the manner in which the invention is applied thereto.

The upper conduit or horizontal course 5 is adapted to be provided with a series of equidistantly spaced discharge openings 5a in the underside thereof for discharging material into a discharge hopper or chute 5b into hoppers to be conveyed to a point remote from the bins or hoppers 19, 20 and 21.

The circuitous conveyor conduit is provided with an endless conveyor therein including a sprocket chain made up of a series of endless chain links 22 (Figure 5) which are joined by a hooked portion 23 at one end thereof secured to the loop of an adjacent link 22. The chain links 22 are provided with laterally extending lugs 24 to which the conveyor flights are secured. The conveyor flights may be constructed in accordance with the type of conveyor housing or conduit being employed and may take any one of the forms as shown in Figures 10 to 13 inclusive. However, as shown in Figures 1 to 6 inclusive, the conveyor flights are constructed of a disc of rubber or synthetic rubber composition 25 sandwiched between disc-like plates 26 which are slightly smaller in diameter than the rubber or synthetic rubber flights 25 so as to terminate a short distance from the edge thereof. Bolts 27 and nuts 28 are provided for securing the conveyor flights including the rubber or synthetic rubber composition flights 25 and disc plates 26 to the laterally projecting lug 24 of the chain link 22. The flights are provided with radially extending cut out portions 29 for receiving the rim of a sprocket wheel or gear wheel, whichever is used.

Figure 2:
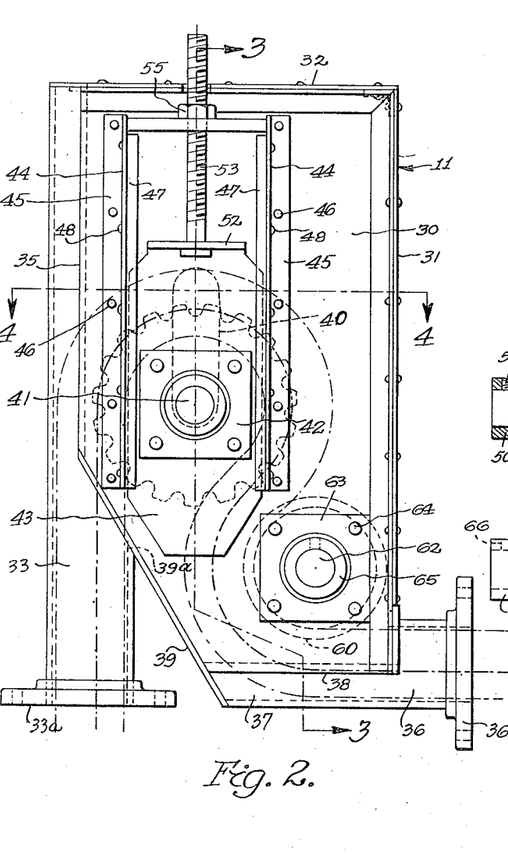
Figure 2 is a side elevational view of one of the conveyor displacing and guiding devices employed in the run-around conveyor for guiding the endless conveyor element during its travel from the vertical portion of the housing to the horizontal portion.
Figures 3, 4:
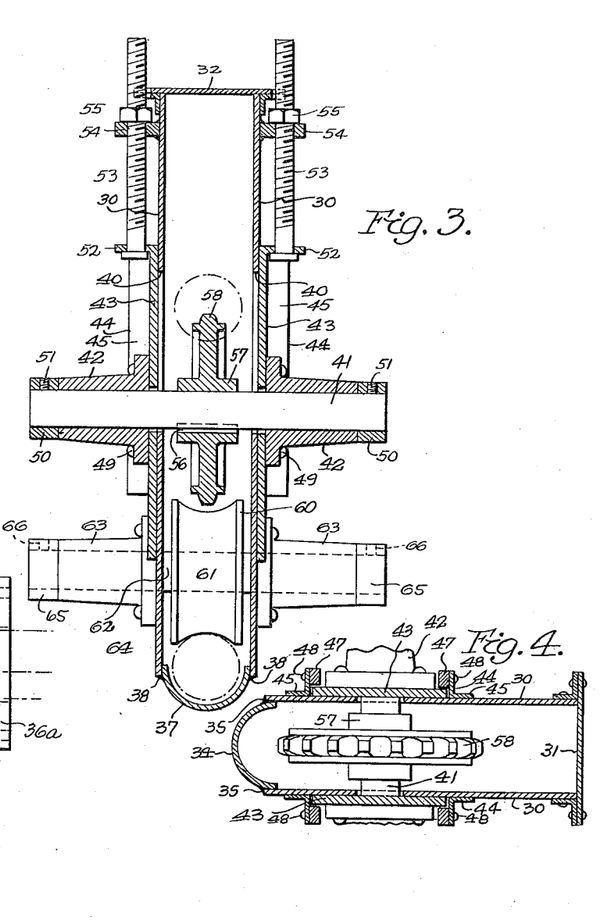
Figure 3 is a vertical cross-sectional view taken on the zigzag line 3—3 of Figure 2 looking in the direction of the arrows showing the manner in which the traversing sprocket wheel or pulley is arranged for adjustment and wear take-up.
Figure 4 is a horizontal cross-sectional view taken on line 4—4 of Figure 2 looking in the direction of the arrows and illustrating the contour of the housing and the manner in which the sprocket, pulley or gear is adjustably supported for wear take-up.

The conveyor displacing and guiding device 11 (Figures 2, 3 and 4) has a pair of side walls 30 closed at one end by an end wall 31 and at the top by a top wall 32. The end and top walls 31 and 32 may be secured to the side walls 30 by rivets or the like or by welding. The other end wall is formed from a tubular conduit 33 which has its upper portion cut away to provide a semi-circular portion 34 (Figure 4) which may be welded to the side walls 30 as at 35. Similarly, the bottom wall is formed from a tubular conduit 36 and is cut away to provide a semi-circular portion 37 adapted to be welded to the lower edges of the side walls 30 as at 38 (Figure 3). The lower corners of the side walls 30 are cut away and this portion of the housing is closed by an inclined wall or material slide 39 welded or otherwise secured in place with the lower portion of the side walls 30 welded to the tubular conduit 33 and to the semi-circular portion 37 of the tubular conduit 36.

Formed in the side walls 30 is a pair of vertically arranged elongated slots 40 (Figures 3 and 4) for adjustably receiving a rotary shaft 41 which has its ends mounted in bearing blocks 42 carried by adjustable slide plates 43 mounted between guides or ways 44. The guides or ways 44 are constructed of angle bars 45 riveted to the side walls 30 as at 46 and guide strips 47 are secured to the projecting flanges of the angle bars 45 by rivets or the like 48 to slidably support the slide plates 43. Similarly, the bearing blocks 42 are riveted to the slide plates 43 as at 49 and are provided with relatively long tubular portions to provide large bearing surfaces for the rotary shaft 41. Retaining collars 50 are secured to the ends of the rotary shaft 41 and held in place by set screws 51. The upper ends of the slide plates 43 are flanged as at 52 (Figure 3) for receiving the lower ends of adjusting shafts 53 which extend vertically and pass through openings in bars 54 welded to the side walls 30 of the housing and at the end to the projecting flanges of the angle bars 45. Adjusting nuts 55 are threaded on the adjusting bolts 53 so that by turning the nuts 55, the rotary shaft 41 will be elevated or lowered as desired.

The rotary shaft 41 is provided with a keyway for receiving a locking key 56 for locking the hub 57 of a pulley, gear or sprocket wheel to the rotary shaft 41. In the present case, the sprocket wheel 58 is illustrated and is arranged so that its peripheral portion is aligned with a tubular conduit 33 at a point above the tubular conduit 36. The endless conveyor, including the endless sprocket chain 22 carrying the flight element 25 is adapted to be trained over the sprocket wheel 58, and in order that the endless sprocket element may travel in a sinuous zigzag path while traversing the bend between the vertical conduit 7 and the horizontal conduit 5, an idler pulley 60 is mounted adjacent the sprocket 58 with its peripheral portion above the center line of the conduit 36. The idler pulley 60 is provided with a grooved peripheral surface 61 and shaped to conform to the contour of the disc-like conveyor elements 25. The idler pulley is secured to a shaft 62 which has its ends projecting through suitable openings in the side walls 30 of the device 11 so as to be supported in bearing blocks 63 similar to the bearing blocks 42. The bearing blocks 63 may be riveted or otherwise secured to the side walls 30 of the housing as at 64 and the rotary shaft 62 is limited against endwise movement by retaining collars 65 mounted on the ends thereof and held in place by set screws or the like as at 66. It will thus be seen that the endless conveyor element will travel upwardly above the sprocket wheel 58 and will pass about the axis of the shaft 41 so as to pass over the grooved pulley 60 in a reverse direction. The sinuous pathway that the endless conveyor element travels causes the conveyor element to be removed from the flow path of material being handled while passing about the sprocket 58. The material overflows the upper edge 39a of the inclined wall or slide 39 and slides downwardly by gravity to the bottom wall 37 where it is again picked up by the flights on the endless conveyor element and conducted through the endless conduit 5. The tubular conduit portions 33 and 36 are provided with flanges 33a and 36a for being bolted to the vertical and horizontal conveyor conduits 7 and 5 respectively.

Figure 5:
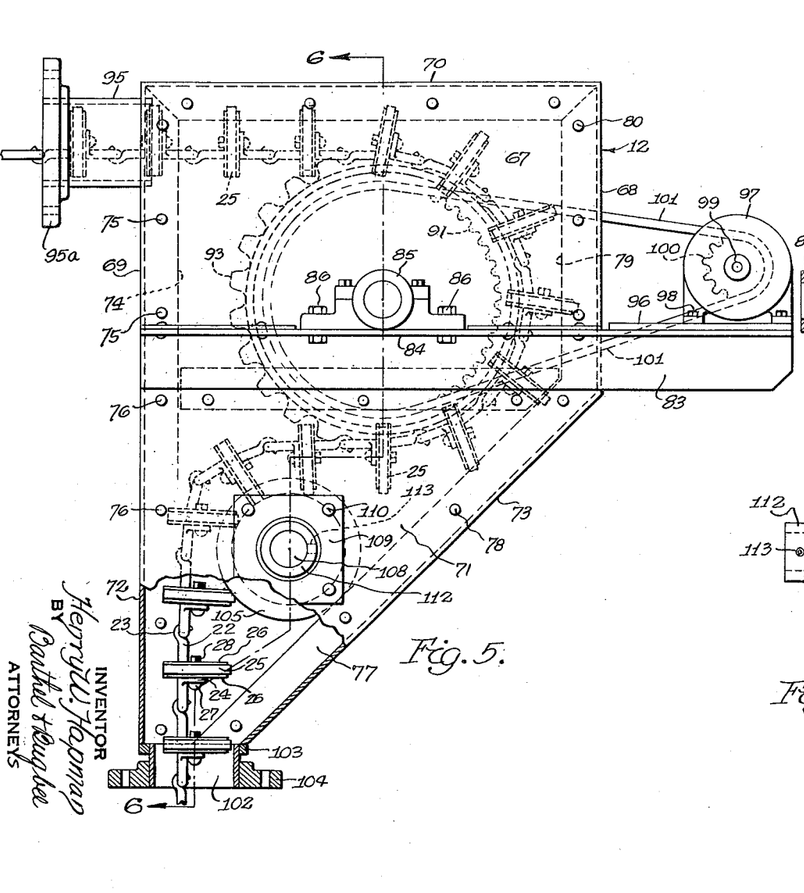
Figure 5 is a side elevational view of the conveyor displacing and guiding device for guiding the endless conveyor elements from a horizontal course to a vertical course.
Figure 6:
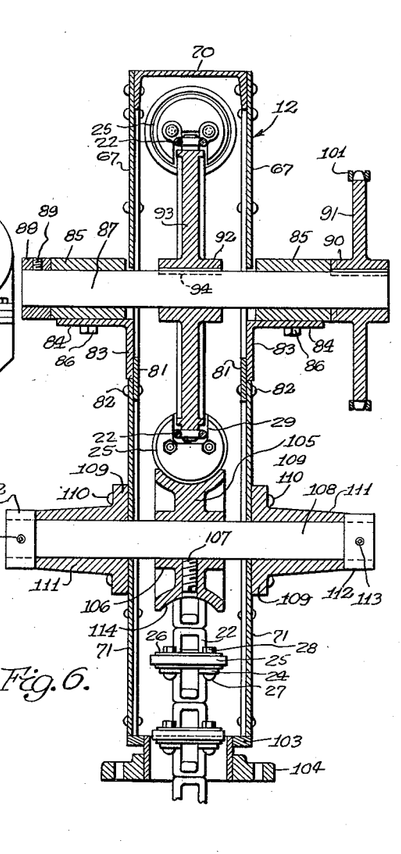
Figure 6 is a vertical cross-sectional view taken on the zigzag line 6—6 in Figure 5 looking in the direction of the arrows and further illustrating the arrangement of the various traversing drive and idler sprocket, pulley or gear wheels for guiding the endless conveyor element from a horizontal course to a vertical course.

In order to carry out the same condition during the passage of the endless conveyor element from the horizontal conduit 5 to the vertical conduit 8, the conveyor displacing and guiding device 12 as shown in Figures 1, 5 and 6 is provided and said device 12 includes an upper section having side walls 67 connected by end walls 68 and 69 and at the top by a top wall 70. The upper housing section is rectangular in shape, while the lower housing section is triangular and includes side walls 71 connected by a vertical end wall 72 and an inclined wall 73. The casing sections are adapted to be held together by a pair of vertical bars 74 secured in place by rivets 75 passing through the side walls 67 of the upper casing section and by rivets 76 passing through the side wall 71 of the lower triangular casing section. Similarly, a pair of bars 77 are riveted to the inclined edges of the lower casing wall 71 so that the upper angular portion thereof 79 may be riveted to the upper casing side wall 67 by rivets or the like as at 80. The joint between the casing sections is bridged by a pair of horizontal bars or strips 81 secured to the upper edges of the side walls 71 of the lower casing section by rivets as at 82.

A pair of angle bars 83 are welded or otherwise secured to the side wall 67 of the upper casing section so that their flanges as at 84 will project laterally therefrom in opposite directions. Supported by each of the oppositely extending flanges 84 is a divided bearing block 85 which is bolted to said flanges by bolts 86. Rotatably mounted in the bearing block 85 is a rotary shaft 87 which is provided on one end with a retaining collar 88 secured in place by a set screw or locking key as at 89. The other end of the rotary shaft 87 projects beyond the bearing block 85 and has keyed thereto the hub 90 of a sprocket wheel 91. Similarly, the hub 92 of a sprocket wheel 93 is keyed to the intermediate portion of the rotary shaft 87 by means of a key and slot connection 94 and the peripheral or rim portion of the sprocket wheel 93 is mounted in alignment with the conduit section 95 extending through the end wall 69 of the upper casing section 12. Extending between the angle bars 83 and secured thereto by welding or the like is a platform 96 upon which the base of an electric motor 97 is supported and secured by bolts or the like 98. The armature shaft 99 of the electric motor 97 is provided with a sprocket wheel 100 over which is trained a sprocket chain 101 for drivingly connecting the sprocket wheel 91.

The tubular conduit 95 is adapted to be welded or otherwise secured within an opening in the end wall 69 of the upper casing 12 and is provided with a flange 95a for being connected to a complementary flange on the end of the upper horizontal conveyor conduit 5. Similarly, a short conduit section 102 is welded or otherwise secured to the lower portion of the lower casing section and in order to secure the conduit section 102 in place, a plate 103 is welded or otherwise secured to the lower edge of the end wall 72, side walls 71 and inclined wall 73. A flange 104 is welded or otherwise secured to the short conduit section 102 to facilitate attachment of the device 12 to the vertical conveyor conduit 8, thereby completing the circuitous conveyor pathway and providing for the return of the endless conveyor element and flights to the lower course after the material has been discharged through the opening in the under side of the horizontal conveyor conduit 5.

Mounted in the triangular-shaped lower section of the device 12 is an idler pulley 105 which has its hub 106 secured by means of a set screw 107 to a rotary shaft 108. The ends of the rotary shaft 108 project through suitable openings in the side wall 71 similar to the shaft 87 and are supported in bearing blocks 109 riveted or otherwise secured to the side walls 71 by rivets 110. The bearing blocks 109 are provided with tubular bearing bosses 111 to adequately support the rotary shaft 108 and retaining collars 112 are affixed to the end of the rotary shaft 108 and held thereon by means of set screws 113. The idler pulley 105 is provided with a grooved peripheral portion 114 for engaging the peripheral edge of the conveyor flight elements 25 as illustrated clearly in Figure 6. Also, it is to be noted that the idler pulley 105 is arranged with its axis offset vertically from the axis of the rotary shaft 87 so that the endless conveyor element will travel in a sinuous path and will be removed from the flow stream or path while negotiating the turn between the horizontal conveyor conduit 5 and the vertical conveyor conduit 8. Any material not being discharged through the discharge openings in the conveyor conduit 5 passes through the short conduit section 95 and into the upper portion of the device 12 where it falls by gravity toward the short conveyor conduit section 102 and is thence carried downwardly through the conveyor or conduit 8 by the endless conveyor flight. It will thus be seen that the material being handled after being freed from the conveyor flights, passes through the lower portion of the housing without contacting the sprocket wheel 93 or without being deposited upon the rotary shaft 87, and that the sprocket wheel 93 and shaft 87 are entirely removed from the flow path so that the various bearing portions thereof will not be subjected to excessive wear when handling highly abrasive materials such as fly ash, carbon black, and the like.

It is to be understood that the invention may be applied to endless conveyors in which round, square or other flight elements are used and that when using conveyor structures having conveyor flights of different shapes, the sprocket wheels 58 and 93 may be eliminated and conveyor pulley drums provided having either a straight or curved peripheral face in accordance with the particular conveyor flight structure employed. Similarly, the grooved pulleys 60 and 105 may be replaced by either sprockets or idler pulleys, depending upon the shape of the conveyor flight, and if desired, the sprocket wheels 58 and 93 may take the form of a pulley having a V-shaped peripheral face providing a friction groove for engaging the peripheral edges of circular or disc-like conveyor flight elements. It is further to be understood that pairs of sprockets may be used in the housing 11 as well as pairs of pulleys on the shafts 41 and 62, and similarly, pairs of sprockets or pulleys may be mounted on the shafts 87 and 108 of the housing 12, when using endless conveyor elements having certain types of conveyor flight elements other than those shown in the present application.

Figure 7:
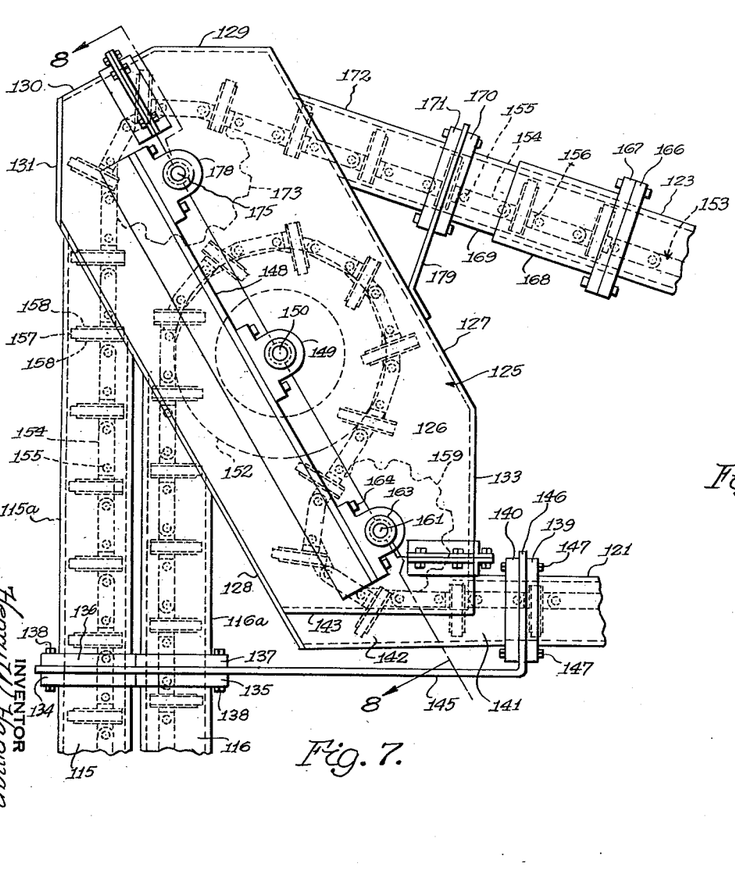
Figure 7 is a side elevational view of a modified form of the invention similar to that shown in Figures 1 to 6 inclusive but constructed for use in connection with an L-type or Z-type conveyor structure.
Figure 8:
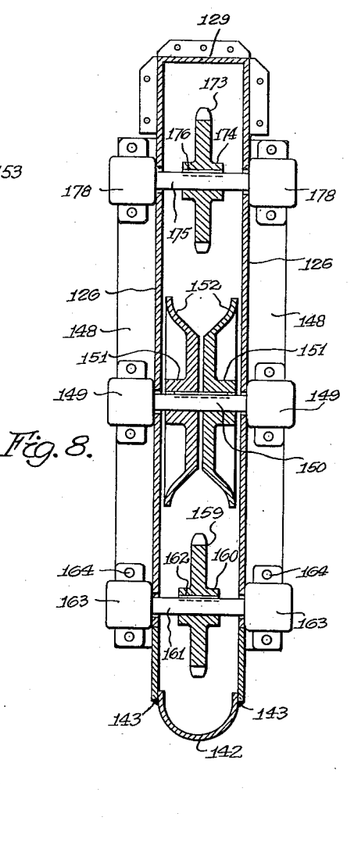
Figure 8 is a diagonal cross-sectional view taken on the oblique line 8—8 in Figure 7 looking in the direction of the arrows and further illustrating the arrangement of the pulley, sprocket or gear wheel employed for removing the endless conveyor element from the flow path while negotiating a turn or bend.
Figures 9, 10, 11, 12, 13:
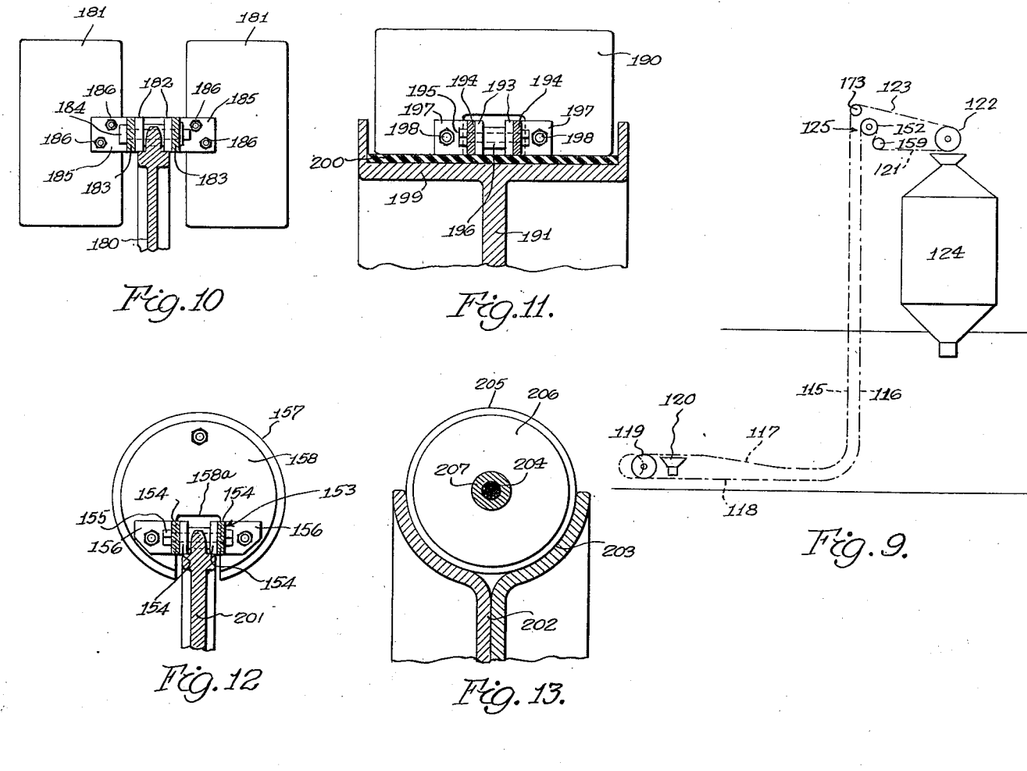
Figure 9 is a diagrammatic view of an L or Z-type conveyor structure upon which the guiding and traversing mechanism as shown in Figures 7 and 8 is intended to be used.
Figure 10 is a transverse cross-sectional view of an endless conveyor element showing one form of flight structure which may be used with the conveyor structure shown in Figures 1 to 9 inclusive.
Figure 11 is a transverse cross-sectional view of another type of endless conveyor structure and pulley which may be used with the conveyor structure shown in Figures 1 to 9 inclusive.
Figure 12 is a transverse cross-sectional view of an endless conveyor element having round or disc-like flights secured to a sprocket chain and passed over a sprocket wheel.
Figure 13 is a transverse cross-sectional view of another type of endless conveyor element and form of pulley wheel which may be used throughout the various forms of the invention shown in Figures 1 to 9 inclusive in lieu of the sprocket chain type endless conveyor.

*Description of the invention shown in Figures 7 to 9 inclusive*

In the modified form of the invention shown in Figures 7 to 9 inclusive, an L or Z-type conveyor structure is used employing the same idea as set forth in the form of the invention shown in Figures 1 to 6 inclusive. As shown in Figure 9, the endless conveyor conduit structure includes a pair of vertically arranged parallel conduits 115 and 116 connected at the bottom by horizontal conduits 117 and 118 respectively. The ends of the conduits 117 and 118 are mounted in a suitable boot having an adjustable pulley or sprocket 119 which is movable from the full line position to the dotted line position for the purpose of taking up slack in the endless conveyor element movable through the Z-shaped conduits. A loading hopper 120 is provided adjacent one end of the conveyor conduits 117 for loading the endless conveyor so that the same will travel through the conduits 118 and 116 and thence through a horizontal conveyor conduit 121 to a dumping station and thence around a pulley 122 to a return conduit 123. The material is dumped into a tank or vat 124 as the conveyor traverses the pulley 122, and the structure for negotiating the turn between the vertically arranged parallel conduits 115 and 116 and the horizontal conduits 121 and 123 is illustrated in Figures 7 and 8 in detail. Let it be assumed that a conveyor displacing and guiding device, generally designated 125 is interposed between the vertically arranged conveyor conduits 115 and 116 and horizontally arranged conduits 121 and 123 so that the endless conveyor elements may travel in a continuous pathway from the loading station or hopper 120 to the discharge end or vat 124. The device 125 includes a pair of side walls 126 connected together by inclined upper and lower walls 127 and 128 respectively, the lower inclined wall 128 forming a material slide. The upper portions of the side walls 126 are connected by top walls 129 and 130 which are arranged at an angle to one another, and the inclined wall 130 is connected to the inclined wall 128 by means of a vertical wall 131 which also connects the side walls 126. Similarly, a vertical wall 133 connects the upper inclined wall 127 and extends between the side walls 126. The upper portion of the vertically arranged conveyor conduits 115 and 116 are provided with flanges 134 and 135 respectively to which are bolted the lower ends of a pair of conduit sections 115a and 116a respectively. The lower ends of the conduit sections 115a and 116a are provided with flanges 136 and 137 which are bolted to the flanges 134 and 135 by bolts 138. The upper ends of the conduit sections 115a and 116a are cut on the bias and are welded to the inclined bottom wall 128 in registry with openings therein (Figure 7).

Similarly, the conveyor conduit 121 is provided with a flange 139 which is bolted to a flange 140 on a short conduit section 141 which is cut away to provide a semi-circular portion 142. The semi-circular portion 142 is welded or otherwise affixed to the lower edges of the side walls 126 of the housing 125 as at 143. A supporting bracket 145 in the form of a strap iron is secured between the flanges 134, 136 and 135, 137, and is provided with openings in registry with the openings in the conduits 115 and 116. The other end of the strap iron or bracket 145 is angled as at 146 and is passed between the flanges 139 and 140 of the pipe sections 121 and 141 so as to be held in place by bolts 147. The angle portion 146 is likewise provided with an opening in registry with the openings in the tubular conduits 121 and 141.

Secured to the side walls 126 of the device 125 is a pair of angle bars 148 having a pair of bearing blocks 149 secured thereto for rotatably supporting a rotary shaft 150. The hubs 151 of a split pulley 152 with a rim of arcuate cross-section are keyed to the rotary shaft 150 the rim of the pulley 152 being arranged to provide a V-groove for gripping the peripheral portion of the conveyor flight element 157 as the endless conveyor 153 passes therearound. The endless conveyor 153 is slightly different from that shown in Figures 1 to 6 inclusive, and comprises an endless conveyor chain having side bars 154 connected by pintle pins 155. The conveyor flights are secured to laterally projecting lugs 156 carried by the outer side bars or links 154. Each of the conveyor flights comprises a synthetic rubber or rubber disc 157 sandwiched between supporting plates 158 which are slightly smaller in diameter than the rubber or synthetic rubber disc 157 so as to terminate a short distance from the edge of said rubber or synthetic rubber flights. Suitable fastening means (not shown) such as bolts, nuts or the like, may be provided for securing the supporting plates 158 and rubber or synthetic rubber flight members 157 to the laterally projecting lugs 156. The conveyor flights are provided with radial slots for the purpose of straddling the endless conveyor chain 153 and positioning the flights with respect to the chain so that the chain passes through a point offset from the center thereof.

It will thus be seen that the endless conveyor chain 153 will travel upwardly through the tubular conduits 116, 116a and into the housing 125 where it passes over the split grooved pulley 152 with the arcuately curved rim 152. After the endless conveyor passes around the split grooved pulley, it passes downwardly and is trained over an idler sprocket 159 which has its hub 160 keyed to a rotary shaft 161 as at 162. The ends of the shaft 161 project through suitable openings in the side walls 126 and are supported in bearing blocks 163 which have their bases secured to the flanges of the angle bars 148, by means of machine screws or the like 164. It is to be noted that the axis of the shaft 161 is offset vertically from the axis of the shaft 150 and is arranged so that the endless conveyor chain 153 will travel around the sprocket 159 with the teeth of the sprocket engaging the pintle pins 155. While passing around the sprocket 159, the rubber or synthetic rubber conveyor flights 157 pick up the material and convey the same along the conveyor pathway through the conduit 121. It is to be noted that during the upward travel of the conveyor chain 153, through the conveyor conduits 116 and 116a, the material will overflow the conveyor conduit 116a and pass downwardly along the inclined wall or material slide 128. The material then drops to the semicircular bottom wall 142 and is in position to be picked up by the conveyor flights 157 for being conveyed to the conveyor conduit 121. The material thus passes through a discharge adjacent the pulley 122 and falls in the vat 124. The endless chain or conveyor return conduit 123 is provided with a flange 166 which is bolted to the flange 167 of a coupling sleeve 168. A short section of the tubular conduit 169 is mounted in the coupling 168 and is provided with a flange 170 which is adapted to be bolted to the coupling flange 171 of a short section of tubular conduit 172 which is welded to the inclined wall 127 in registry with an opening thereof for permitting return passage of the endless conveyor chain 153 to the casing or housing 125, where it passes over a sprocket wheel 173, the hub of which as at 174 is keyed to a shaft 175 as at 176. The shaft 175 extends through suitable openings in the side walls 126 of the housing and has its ends journalled in bearings formed in bearing blocks 178 secured to the flanges of the angle bars 148. After the endless conveyor chain 153 and conveyor flight pass over the sprocket wheel 173, the conveyor chain travels then downwardly through the short tubular conduit section 115a and tubular conduit 115 to the horizontal portion 117 (Figure 9) to a point beneath the loading hopper 120. A bracket arm 179 is secured to the upper inclined walls 127 of the housing 125 and is provided on its free end with an opening adapted to register with the conveyor passageway in the conduit sections 169 and 172. The free ends of the bracket are clamped between the coupling flanges 170 and 171 of the short tubular conduit sections 169 and 172.

In the event that it is desired to use an endless conveyor having conveyor flights arranged as shown in Figure 10, the sprocket wheel 180 (Figure 10) may be substituted for the pulley shown in Figures 7 and 8. When using an endless conveyor having spaced rectangular conveyor flights 181, a slightly different structure will be necessary and would require the conduit in the forms of the invention shown in Figures 1 to 9 inclusive to be formed of rectangular cross-section, rather than round section. In Figure 10, an endless conveyor chain is shown being composed of inner and outer links 182 and 183 respectively, connected by pintle pins 184. The outer links 183 are provided with laterally extending projections 185 to which the flights 181 are bolted or otherwise secured as at 186. It will thus be seen that the conveyor structure shown in Figures 1 to 9 inclusive may be provided with an endless conveyor having flights as shown in Figure 10, and that when employing such a conveyor element, sprocket wheels will be substituted for the grooved pulleys 60 and 105 (Figures 1 to 6 inclusive) and a sprocket wheel similar to the one 180 may be substituted for the divided pulley 152 (Figures 7 to 9 inclusive).

As shown in Figure 11, a conveyor flight 190 of a slightly modified form may be used in the forms of the invention in Figures 1 to 9 inclusive by substituting a drum pulley 191 for the various sprockets shown in Figures 1 to 6 inclusive and the V-type pulley shown in Figures 7 and 8. When employing the conveyor flight 190 of rectangular shape, a conveyor chain will be used having inner and outer links 193 and 194 respectively connected by pintle pins 195 spaced by rollers 196. As shown in the case of the conveyor chain in Figure 10, the outer links 194 are provided with lateral projections 197 to which the rectangular flights 190 are bolted as at 198. The peripheral portion 199 of the pulley 191 is provided with a rubber face 200 for frictionally gripping the conveyor chain and flight as the same travel thereover. In order to carry out the scheme shown in Figures 1 to 6 inclusive, 7 and 8, it will be necessary to substitute the pulley 191 (Figure 11) for the sprocket 58 (Figures 1 to 6 inclusive) and alter the shape of the peripheral face of the idler pulley 161. Similarly, in employing the type of flight 190 shown in Figure 11, in the form of the invention shown in Figures 7 and 8, the pulley 191 may be substituted for the divided pulley 162 and an idler drum may be substituted for the sprocket 159.

In Figure 12, there is shown in detail the endless flight conveyor 153 which is identical with the form shown in Figures 7 and 8 including the flight element 157 formed of rubber or synthetic rubber having the metal plates 158 on each side thereof. The flight element 157 and the metal plates 158 are radially slotted as at 158a for the purpose of straddling the links 154 of the conveyor 153. The pintle pins 155 are provided for connecting the inner and outer links similar to Figures 10 and 11. As shown in Figure 12, a sprocket 201 may be substituted for the divided pulley 152 (Figures 7 and 8) similar to Figures 1 to 6 inclusive, and in this event the idler sprocket 159 (Figures 7 and 8) may be removed and provided with a grooved pulley similar to that shown in Figures 1 to 6 inclusive, as at 61. Thus, it will be seen that in using the sprocket 201 in either form of the invention Figures 1 to 6 or 7 to 9 inclusive, the divided pulley 152 (Figures 7 and 8) will be omitted and the sprocket 159 (Figures 7 and 8) will be changed or removed and the grooved pulley provided therefor.

In the flight conveyor shown in Figure 13, there is a pulley 202 having an arcuately grooved face 203 which may be substituted for the sprocket 58 and pulley 152 (Figures 1 to 6, and 7 and 8 respectively) when employing a cable type endless conveyor in which a flexible wire cable 204 is provided with round flight members 205 formed of rubber or synthetic rubber backed by metal plates or discs 206 on each side thereof. In this form of conveyor structure, the conveyor flights are spaced by rubber spacers 207 mounted on the flexible wire core 204. When using an endless structure as shown in Figure 13, in neither of the forms of the invention shown in Figures 1 to 6 and 7 to 9 will it be necessary to provide grooved idler pulleys similar to the idler pulleys 61 shown in Figures 1 to 6 inclusive. Of course, the sprocket 58 (Figures 1 to 6 inclusive) may be removed and the pulley 202 substituted therefor.

Applicant has shown a number of ways in which the invention may be carried out and applied to all types of conveyor structures employing flexible endless conveyor elements provided with conveyor flights in equidistantly spaced relation thereon.

It is to be understood that the forms of the invention herewith shown and described are to be taken as preferred embodiments thereof and that various changes may be made in the shape, size and arrangement of parts without departing from the spirit of the invention or the scope of the subjoined claims.

What I claim is:

1. A conveyor structure comprising a circuitous conveyor conduit having at least one abrupt bend, a flight conveyor movably mounted in said conduit and having an endless flexible propelling member with spaced conveyor flights mounted thereon, a housing interposed in said bend of said conveyor conduit, said housing having an inlet in the upper portion thereof and an outlet in the lower portion thereof for the entrance and exit respectively of said flight conveyor, a material slide extending downwardly from said inlet toward said outlet, and upper and lower guide wheels journaled one below the other in said housing and positioned to guide said flight conveyor in a sinuous path away from the material pathway down said slide between said inlet and said outlet, said lower guide wheel being positioned near the lower portion of said slide for directing said flight conveyor into close proximity to said slide whereby to again pick up the conveyed material which has slid down the slide after the material-freed conveyor has passed around said guide wheels and convey the regained material outward from said housing through said outlet.

2. A conveyor structure comprising a circuitous conveyor conduit having at least one abrupt bend, a flight conveyor movably mounted in said conduit and having an endless flexible propelling member with spaced conveyor flights mounted thereon, a housing interposed in said bend of said conveyor conduit, said housing having an inlet in the upper portion thereof and an outlet in the lower portion thereof for the entrance and exit respectively of said flight conveyor, a material slide extending downwardly from said inlet toward said outlet, and upper and lower guide wheels journaled one below the other in said housing and positioned to guide said flight conveyor in a sinuous path away from the material pathway down said slide between said inlet and said outlet, said lower guide wheel being positioned near the lower portion of said slide for directing said flight conveyor into close proximity to said slide whereby to again pick up the conveyed material which has slid down the slide after the material-freed conveyor has passed around said guide wheels and convey the regained material outward from said housing through said outlet, one of said guide wheels having sprocket teeth engaging said flexible propelling member and the other guide wheel having a plain peripheral surface engaging the conveyor flights and guiding the conveyor.

3. A conveyor structure comprising a circuitous conveyor conduit having at least one abrupt bend, a flight conveyor movably mounted in said conduit and having an endless flexible propelling member with spaced conveyor flights mounted thereon, a housing interposed in said bend of said conveyor conduit, said housing having an inlet in the upper portion thereof and an outlet in the lower portion thereof for the entrance and exit respectively of said flight conveyor, a material slide extending downwardly from said inlet toward said outlet, and upper and lower guide wheels journaled one below the other in said housing and positioned to guide said flight conveyor in a sinuous path away from the material pathway down said slide between said inlet and said outlet, said lower guide wheel being positioned near the lower portion of said slide for directing said flight conveyor into close proximity to said slide whereby to again pick up the conveyed material which has slid down the slide after the material-freed conveyor has passed around said guide wheels and convey the regained material outward from said housing through said outlet, one of said guide wheels having sprocket teeth engaging said flexible propelling member and the other guide wheel having a grooved peripheral surface engaging the conveyor flights and guiding the conveyor.

4. A conveyor structure comprising a circuitous conveyor conduit having at least one abrupt bend, a flight conveyor movably mounted in said conduit and having an endless flexible propelling member with spaced conveyor flights mounted thereon, a housing interposed in said bend of said conveyor conduit, said housing having an inlet in the upper portion thereof and an outlet in the lower portion thereof for the entrance and exit respectively of said flight conveyor, a material slide extending downwardly from said inlet toward said outlet, and upper and lower guide wheels journaled one below the other in said housing and positioned to guide said flight conveyor in a sinuous path away from the material pathway down said slide between said inlet and said outlet, said lower guide wheel being positioned near the lower portion of said slide for directing said flight conveyor into close proximity to said slide whereby to again pick up the conveyed material which has slid down the slide after the material-freed conveyor has passed around said guide wheels and convey the regained material outward from said housing through said outlet, said guide wheels having grooved peripheral surfaces engaging the conveyor flights and guiding the conveyor.

5. In a conveyor structure comprising a tubular duct arranged in a circuitous-shaped pathway having an abrupt turn at the upper and lower ends thereof, a casing interposed in said pathway having a pair of inlets and a pair of outlets in communication with said circuitous tubular duct, an endless flexible conveyor element operating in said duct, a series of flight elements secured to said endless flexible conveyor element for propelling material through said circuitous duct from a loading station to a dumping station, a guide wheel in said casing for causing the conveyor element to be moved out of the flow path of said material, a guide wheel mounted below said first-mentioned guide wheel for returning said flexible conveyor element to said flow path, and a material slide in said casing extending downwardly from one of said inlets toward one of said outlets for directing material toward the floor of said casing, said second guide wheel being positioned near the lower portion of said material slide for directing said flight conveyor element into close proximity thereto so that the material falling down said material slide will be again picked up and conveyed to said dumping station, the other of said inlets and the other of said outlets being disposed above said material slide.

6. In a conveyor structure comprising a tubular duct arranged in a circuitous-shaped pathway having an abrupt turn at the upper and lower ends thereof, a casing interposed in said pathway having a pair of inlets and a pair of outlets in communication with said circuitous tubular duct, an endless flexible conveyor element operating in said duct, a series of flight elements secured to said endless flexible conveyor element for propelling material through said circuitous duct from a loading station to a dumping station, a guide wheel in said casing for causing the conveyor element to be moved out of the flow path of said material, a guide wheel mounted below said first-mentioned guide wheel for returning said flexible conveyor element to said flow path, a material slide in said casing extending downwardly from one of said inlets toward one of said outlets for directing material toward the floor of said casing, said second guide wheel being positioned near the lower portion of said material slide for directing said flight conveyor element into close proximity thereto so that the material falling down said material slide will be again picked up and conveyed to said dumping station, the other of said inlets and the other of said outlets being disposed above said material slide, and a third guide wheel in the upper end of said casing for guiding the return course of said flexible endless conveyor through the other of said pair of inlets and outlets to said loading station.

7. In a conveyor structure comprising a tubular duct arranged in a circuitous-shaped pathway having an abrupt turn at the upper and lower ends thereof, a casing interposed in said pathway having a pair of inlets and a pair of outlets in communication with said circuitous tubular duct, an endless flexible conveyor element operating in said duct, a series of flight elements secured to said endless flexible conveyor element for propelling material through said circuitous duct from a loading station to a dumping station, a guide wheel in said casing for causing the conveyor element to be moved out of the flow path of said material, a guide wheel mounted below said first-mentioned guide wheel for returning said flexible conveyor element to said flow path, and a material slide in said casing extending downwardly from one of said inlets toward one of said outlets for directing material toward the floor of said casing, said second guide wheel being positioned near the lower portion of said material slide for directing said flight conveyor element into close proximity thereto so that the material falling down said material slide will be again picked up and conveyed to said dumping station, the other of said inlets and the other of said outlets being disposed above said material slide, said first-mentioned pair of inlets and outlets being arranged with the inlet disposed above the outlet so that the material will fall by gravity to the lower portion of said casing.

HENRY W. HAPMAN.

REFERENCES CITED

The following references are of record in the file of this patent:

UNITED STATES PATENTS

| Number | Name | Date |
|---|---|---|
| 2,245,073 | Hapman | June 10, 1941 |
| 2,429,549 | Hapman | Oct. 21, 1947 |

FOREIGN PATENTS

| Number | Country | Date |
|---|---|---|
| 524,058 | Great Britain | July 29, 1940 |